(12) United States Patent
Abeguile et al.

(10) Patent No.: US 7,633,013 B2
(45) Date of Patent: Dec. 15, 2009

(54) COLORED FOAMING POLYMER COMPOSITION

(75) Inventors: Mikael Abeguile, Chaponost (FR); Jerome Alric, L'isle D'abeau (FR); Thierry Auvray, Lancaster, PA (US); Paul Kroushl, Lancaster, PA (US)

(73) Assignee: Nexans, Paris (FR)

( * ) Notice: Subject to any disclaimer, the term of this patent is extended or adjusted under 35 U.S.C. 154(b) by 0 days.

(21) Appl. No.: 12/079,075

(22) Filed: Mar. 24, 2008

(65) Prior Publication Data

US 2009/0236118 A1    Sep. 24, 2009

(51) Int. Cl.
*H01B 7/00*    (2006.01)

(52) U.S. Cl. .................................. 174/110 R; 174/116

(58) Field of Classification Search ............. 174/110 R, 174/113 R, 113 C, 120 R, 121 R
See application file for complete search history.

(56) References Cited

U.S. PATENT DOCUMENTS

| | | | | |
|---|---|---|---|---|
| 4,808,966 | A | * | 2/1989 | Ferlier et al. ................. 338/214 |
| 5,726,214 | A | * | 3/1998 | Buckmaster et al. ......... 521/145 |
| 5,814,768 | A | * | 9/1998 | Wessels et al. ........ 174/110 FC |
| 6,231,919 | B1 | * | 5/2001 | Craton ....................... 427/119 |
| 2008/0033083 | A1 | * | 2/2008 | Li et al. ...................... 524/115 |

\* cited by examiner

*Primary Examiner*—William H Mayo, III
(74) *Attorney, Agent, or Firm*—Sofer & Haroun, LLP

(57) ABSTRACT

A foaming composition includes a fluoropolymer, a nucleating agent and a pigment, wherein said pigment is a manganese-antimony-titanium (Mn—Sb—Ti) oxide pigment.

10 Claims, No Drawings

COLORED FOAMING POLYMER COMPOSITION

FIELD OF THE INVENTION

The present invention relates to a colored foaming polymer composition, a conductor wire insulated with said composition, an electrical cable comprising at least one of said insulated conductor wire and an electrical cable comprising a cross spacer obtained from said composition. More particularly, said composition is for use in the manufacture of dielectric insulated material for power or communication electrical cables such as local area network (LAN) cables, in particular plenum LAN cables according to standard ANSI/TIA/EIA-568-B-2 Category 6A Draft 9.0., aeronautic cables, industrial cables and automotive cables, in particular T6 automotive cables according to the ISO6722 standard.

BACKGROUND OF THE INVENTION

Plenum LAN cables are formed by assembling together four twisted pairs of insulated copper wires, in which each twisted pair comprises a copper wire coated with a white colored fluoropolymer layer associated with a copper wire coated with a blue, green, orange or brown colored fluoropolymer.

Said brown colored fluoropolymer layer is typically a foamed layer obtained by foaming a polymer composition comprising fluoropolymer, a nucleating agent and iron oxide pigments, said pigments being basically used as standard brown pigments in such electrical cables.

However, it was found that upon foaming conditions, the presence of iron oxide pigments activates the thermal degradation of the fluoropolymer and, consequently promotes melt viscosity variations leading to an unstable flow during the extrusion process.

Hence, the brown foamed layer obtained by said unstable foaming process presents insulation defects, degraded dielectric properties as well as discoloration. The manufacturing conditions of the brown LAN insulated wire are thus limited, and an important amount of scrapped material is generated during the extrusion process.

OBJECT AND SUMMARY OF THE INVENTION

The present invention seeks to solve the above-mentioned problems of the prior art.

To this end, an object of the present invention is to provide a foaming composition comprising a fluoropolymer, a nucleating agent and a pigment wherein said pigment is a manganese-antimony-titanium (Mn—Sb—Ti) oxide pigment, and more preferably the lattice type of said pigment is rutile.

By means of the invention, said composition leads to stable foaming process, more particularly during extrusion, in terms of diameter control, void degree and capacitance consistency.

The brown foamed dielectric insulation material obtained from said composition leads to good dielectric properties, without presenting any discoloration.

In a particular embodiment, the composition comprises less than 5% by weight of Mn—Sb—Ti oxide pigments, and more preferably less than 1% by weight of Mn—Sb—Ti oxide pigments in order to maintain advantageously high dielectric performances of the foamed insulation required for cables according to the present invention.

The fluoropolymer of the present invention has preferably a melting temperature above 250° C. and is advantageously a thermoplastic fluoropolymer such as a tetrafluoroethylene copolymer.

For example, said tetrafluoroethylene copolymer can be selected from the group of:
tetrafluoroethylene and hexafluoropropylene copolymers (FEP);
tetrafluoroethylene perfluoroalkoxy vinyl ether copolymers such as tetrafluoroethylene perfluoromethyl vinyl ether copolymers (MFA), tetrafluoroethylene perfluoropropyl vinyl ether copolymers (PFA);
ethylene tetrafluoroethylene copolymers (ETFE);
ethylene chlorotrifluoroethylene copolymers (ECTFE); and mixtures thereof.

Another object is an insulated conductor wire manufacturing process comprising the following steps:
blending a foaming composition according to the present invention above the temperature needed to melt the fluoropolymer, and
extruding said composition around a conductor wire to form a foamed insulation Layer and obtain said insulated conductor wire.

Another object is an insulated conductor wire obtained by the manufacturing process of the present invention. Advantageously, the insulation layer void degree of said insulated conductor wire is less than 55% and depends on the nature of the fluoropolymer used in the foaming composition.

For example, the insulation void degree can be less than 35% in using FEP as fluoropolymer in the foaming composition.

Another object is an electrical cable comprising at least one insulated conductor wire as defined above, and more particularly said electrical cable is a LAN cable.

Indeed, foamed insulation layer obtained from the composition of the present invention can especially be addressed to insulated conductor wires of LAN cables to guarantee high dielectric performances.

Another object is an electrical cable comprising a foamed cross spacer obtained from a composition according to the present invention.

Cross spacers are more particularly used in plenum LAN cable design in order to reduce crosstalk between twisted insulated conductor wire pairs.

MORE DETAILED DESCRIPTION

Further features and advantages of the present invention are described from the following description, which is given by way of non-limiting illustration.

The polymer melting temperatures mentioned all over the present description can be determined by methods which are well-known by the man skilled in the art, such as preferably a Differential Scanning Calorimetry (DSC) method, a Differential Thermal Analysis (DTA) method or a Thermomechanical Analysis (TMA) method.

1/Preparation of a Brown FEP Masterbatch

A brown masterbatch is prepared by melt blending a virgin matrix of fluorinated ethylene propylene (FEP) copolymer (Teflon TE9494 commercialized by DUPONT de NEMOURS) with Mn—Sb—Ti oxide rutile pigments (referenced 10P850 and commercialized by Shepherd) in using a twin screw extruder in corrosion resistant alloy, the temperature profile being from 250° C. to 320° C.

The Mn—Sb—Ti oxide rutile pigments concentration can be less than 30% by weight in the masterbatch, more preferably less than 20% by weight in the masterbatch.

This upper limit (30% by weight) allows advantageously to Limit rheology problems such as the formation of pigments aggregates and agglomerates during the dispersion of the pigments within the masterbatch. Such aggregates and agglomerates could result in an insulation material presenting a non-uniform final coloring.

More preferably the Mn—Sb—Ti oxide rutile pigments concentration can vary from 5% weight to 15% by weight in the masterbatch.

In order to improve the masterbatch opacity, a white filter such as titanium dioxide (Ti-pure R960 commercialized by Dupont Titanium) can be added to the masterbatch.

For example, the titanium dioxide filler concentration can vary from 0.5% by weight to 2% by weight.

Then, said masterbatch is pelletized.

2/Dilution of the Brown FEP Masterbatch to Obtain a Brown FEP Composition and Formation of a Foamed Dielectric Insulation Layer The pelletized masterbatch is melted, the melting temperature being from 250° C. to 420° C., and diluted preferably with the same virgin FEP copolymer in using an extruder. This dilution step allows adjusting the brown color of the masterbatch and obtaining a brown FEP composition preferably comprising less than 5% by weight of Mn—Sb—Ti oxide pigments, and more preferably Less than 1% by weight of Mn—Sb—Ti oxide pigments in order to maintain high dielectric performances of the foamed insulation required for cables according to the present invention In addition, said brown FEP composition thus obtained comprises a nucleating agent such as boron nitride.

Said nucleating agent can be added to any step of the preparation of the foaming composition.

For example, the nucleating agent is added during the masterbatch preparation or during the dilution step of said masterbatch in using or not a virgin FEP masterbatch.

It is preferable that the composition comprises Less than 2% by weight of the nucleating agent, and more preferably Less than 1% by weight of the nucleating agent, in order that the composition keeps good mechanical properties during extrusion process.

To foam said composition, injector ports of $N_2$ gas are included in the extruder, said physical foaming technical being well-know in the art. The $N_2$ gas is injected into the foaming composition inside the extruder before that said composition is extruded around a conductor wire outside the extruder.

However, the foaming process is not Limited to a physical foaming process but can be as well a chemical foaming process.

In this case, the composition further comprises a chemical foaming agent which has a decomposition temperature above the melting point of the fluoropolymer. The foaming process occurs during the decomposition of the chemical foaming agent inside the extruder before that said composition is extruded around a conductor wire outside the extruder.

The brown FEP composition is then extruded directly around a copper conductor wire to form a brown foamed dielectric insulation layer and to obtain a conductor wire insulated with said composition. Said insulated conductor wire has a total diameter of 0.0482 mil with a foamed dielectric insulation layer thickness of 0.0125 mil of a constant diameter with a uniform brown coloring.

The measured foaming density, or in other words the void degree, of the foamed dielectric insulation layer is of 32%.

The void degree is assessed on line by the measure of the capacitance.

The capacitance is measured on line during extrusion using a high speed capacitance measuring instrument. The capacitance measurement device is a tube where an electronic unit supplies the measuring tube with a high frequency sinusoidal voltage. The isolated conductor wire, which passes trough the measuring tube, is earthed and generates a capacitive current measured by the electronic unit.

It can be also directly measured on Mettler-Toledo weighing equipment by measuring the weight deviation of the foamed dielectric insulation layer between air and ethanol.

The online capacitance specification range is from 39.6 picofarads/feet to 40.6 picofarads/feet.

The brown foamed dielectric insulated layer obtained by the above mentioned complies with dielectric requirement for LAN insulated conductor wire.

While some embodiments of the present invention have been described above, it should be understood that it has been presented by way of examples only and not meant to limit the invention.

It will be understood by those skilled in the art that various changes in form and detail may be made therein without departing from the spirit and scope of the invention as defined in the appended claims.

Thus, the breadth and scope of the present invention should not be limited by the above-described exemplary embodiments, but should be defined only in accordance with the following claims and their equivalents.

The invention claimed is:

1. Foaming composition comprising:
    a fluoropolymer;
    a nucleating agent; and
    a pigment, wherein said pigment is a manganese-antimony-titanium (Mn—Sb—Ti) oxide pigment.

2. Composition according to claim 1, wherein the composition includes less than 5% by weight of Mn—Sb—Ti oxide pigments.

3. Composition according to claim 2, wherein the composition includes less than 1% by weight of Mn—Sb—Ti oxide pigments.

4. Composition according to claim 1, wherein said fluoropolymer is a tetrafluoroethylene copolymer.

5. Composition according to claim 4, wherein said tetrafluoroethylene copolymer is selected from the group of tetrafluoroethylene and hexafluoropropylene copolymers; tetrafluoroethylene perfluoroalkoxy vinyl ether copolymers; ethylene tetrafluoroethylene copolymers; ethylene chlorotrifluoroethylene copolymers; and mixtures thereof.

6. Insulated conductor wire manufacturing process comprising the following steps:
    blending a foaming composition according to claim 1, above the temperature needed to melt the fluoropolymer, and
    extruding said composition around a conductor wire to form a foamed insulation layer and obtain said insulated conductor wire.

7. Insulated conductor wire obtained by the manufacturing process of claim 6.

8. Electrical cable comprising:
    at least one insulated conductor wire as defined in claim 7.

9. The electrical cable according to claim 8, wherein said electrical cable is a plenum LAN cable.

10. Electrical cable comprising:
    a foamed cross spacer obtained from a composition as defined in claim 1.

* * * * *